United States Patent [19]

Butler et al.

[11] 4,361,606

[45] Nov. 30, 1982

[54] METHOD FOR IRRADIATION OF POLYMERIC LAMINATES AND PRODUCT

[75] Inventors: John M. Butler, Centerville, Ohio; Charles L. D. Chin, Avon, Conn.

[73] Assignee: Monsanto Company, St. Louis, Mo.

[21] Appl. No.: 192,630

[22] Filed: Sep. 30, 1980

[51] Int. Cl.³ .................. B29C 27/02; B29D 9/10
[52] U.S. Cl. .................. 428/17; 156/275.5; 264/22; 264/171; 264/248; 280/154.5 R
[58] Field of Search .............. 264/22, 243, 21, 24, 264/171, 248, 148; 428/17, 516, 519, 521, 523, 97; 280/152 R, 152.3, 153 R, 154.5 R; 156/272

[56] References Cited

U.S. PATENT DOCUMENTS

| | | | |
|---|---|---|---|
| 2,936,261 | 5/1960 | Cole | 428/516 |
| 2,940,869 | 6/1960 | Graham | 427/36 |
| 3,507,010 | 4/1970 | Doleman et al. | 425/134 |
| 3,590,109 | 6/1971 | Doleman et al. | 264/216 |
| 3,663,662 | 5/1972 | Golike et al. | 525/220 |
| 3,899,192 | 8/1975 | Reddaway | 280/154.5 R |
| 4,101,699 | 7/1978 | Stine et al. | 428/521 |
| 4,147,291 | 4/1979 | Akao et al. | 428/516 |
| 4,214,030 | 7/1980 | Rakes et al. | 428/519 |

FOREIGN PATENT DOCUMENTS 1108762 4/1968 United Kingdom ......... 174/102 SC

OTHER PUBLICATIONS

Gould et al., Irradiation of Polymers, A.C.S., Washington, D.C., (1967), pp. 139-155.
Anon., Package Engineering, Jan. 1980, pp. 12-13.

*Primary Examiner*—Willard E. Hoag
*Attorney, Agent, or Firm*—Michael J. Murphy

[57] ABSTRACT

Three-dimensional laminates having improved ductility and resistance to cracking at low temperatures are produced by subjecting the formed laminates to high energy ionizing radiation to preferentially promote crosslinking in at least one layer of the laminate which layer per se has poor low temperature properties. In the preferred form a laminate useful in producing spray reducing rain flaps for vehicle tires is provided by irradiating a fusion bonded laminate comprising a three-dimensional grasslike layer of high melt index, low density polyethylene and a high density polyethylene substrate at an average dose of at least about 10 and preferably about 30 megarads. The resulting rain flap remains ductile at temperatures down to at least about minus 20° F. (minus 29° C.) and preferably minus 40° F. (minus 40° C.).

15 Claims, 14 Drawing Figures

METHOD FOR IRRADIATION OF POLYMERIC LAMINATES AND PRODUCT

The present invention is directed to a process for improving the low temperature properties of bonded laminates containing at least one layer which is radiolytically crosslinkable by irradiation with high energy ionizing radiation. More specifically, this invention in its preferred form is directed to a process for improving the low temperature mechanical properties of a fusion bonded three-dimensional laminate which comprises a three-dimensional layer of low density polyethylene and a substrate layer of high density polyethylene.

Laminates comprising a plurality of polymeric layers intimately bonded together, e.g., by adhesives or by fusion find many industrial applications. One particularly useful class of industrial laminates is that in which the laminate contains at least one three-dimensional layer. Among the many uses of such laminates is the fabrication of rain flap devices for reducing the spray and splash of fluid thrown from the wheels of a moving vehicle as described in U.S. Pat. No. 3,899,192. This rain flap, which can be utilized in the same manner as conventional mud flaps, is disposed on the vehicle so that the three-dimensional surface of the laminate captures fluid thrown from the wheels and drains it back onto the roadway surface. In this manner, the splash and spray from a moving vehicle, e.g., a truck, is substantially reduced, thereby reducing the safety hazard to other vehicles which may be passing the truck in either direction.

While the splash and spray reducing rain flap comprising such a three-dimensional laminate has found wide acceptance in the transportation industry, this device is not completely free of drawbacks. Materials normally used to form the three-dimensional layer of this laminate, such as high melt index low density polyethylene, typically have poor low temperature mechanical properties, particularly ductility and impact. Cracking and resultant failure of these three-dimensional laminates due to poor low temperature ductility and impact resistance is often exacerbated by the geometry of the three-dimensional layer. This three-dimensional layer typically comprises a base portion in the form of a series of intersecting ribs and a plurality of blade-like protrusions clustered at the intersections. The intersection points provide areas of high stress localization which can result in the development of localized cracks which can propagate through the thickness of the three-dimensional layer. While it might be suspected that the utilization of a substrate or backing layer made from material which has good low temperature properties would compensate for the deficiencies of the three-dimensional layer and provide the laminate with acceptable ductility and impact resistance, it has been unexpectedly found that the hereinafter described three-dimensional laminate materials exhibit significant embrittlement-related failure when used at low temperature conditions. Applicants have discovered that low temperature embrittlement of the three-dimensional layer causes failure of the entire laminate at temperatures at which the substrate itself remains ductile. The failure of the entire laminate is believed to be due to cracks which initiate in the three-dimensional layer, as described above, and which propagate through the entire thickness of the laminate. Propagation across the interface between the ductile backing layer and the brittle three-dimensional layer occurs where the bonding process (e.g., adhesive or fusion) produces a strong, intimate association of the two layers. Weakly bonded laminates do not necessarily exhibit failure mode.

The present invention is directed to a controlled irradiation process in which the low temperatures properties, especially ductility, of a strongly bonded laminate comprising at least one layer having poor low temperature properties are improved by treating at least the poor property layer of this laminate with high energy ionizing radiation to promote crosslinking in this layer. Irradiation of polymeric materials to promote crosslinking per se is disclosed in the prior art. Typically, this irradiation process has been utilized to improve various properties of polyolefin films including polyethylene. Polyolefin pipes and wire coatings have also been irradiated to effect general improvement in the polymer properties. Applicants are unaware, however, of any attempts to use irradiation to improve the low temperature ductility properties of a strongly bonded laminate which has at least one layer exhibiting poor low temperature ductility properties and at least one substrate layer of good low temperature ductility properties.

Accordingly, it is an object of the present invention to provide a process for improving the low temperature mechanical properties such as ductility and impact resistance of strongly bonded laminates.

More specifically, it is an object of the present invention to provide a process for improving the low temperature ductility properties of a rain flap device which comprises a three-dimensional low density polyethylene layer fusion bonded to a high density polyethylene substrate.

It is also an object of the present invention to provide an irradiated three-dimensional laminate having ductility properties at temperatures of at least about minus 20° F. (minus 29° C.) which are substantially equivalent to the ambient temperature (72° F./22° C.) properties of the non-irradiated laminate.

These and other objects of the present invention are achieved by providing a process for improving the low temperature ductility of a strongly bonded laminate comprising at least one radiolytically crosslinkable polymer layer having poor low temperature ductility and at least one polymeric substrate layer having good low temperature ductility, which process comprises subjecting this laminate to high energy ionizing radiation in an amount sufficient to provide a laminate which remains ductile at temperatures down to at least about minus 20° F. (minus 29° C.).

The present invention also provides an irradiated three-dimensional laminate particularly in the form of a spray suppression device comprising a three-dimensional low density polyethylene layer fusion bonded to a high density polyethylene substrate which laminate remains ductile at temperatures down to at least about minus 20° F. (minus 29° C.).

In the drawings, which illustrate preferred embodiments of the present invention.

Figures 1, 2, 3, 5, 6:
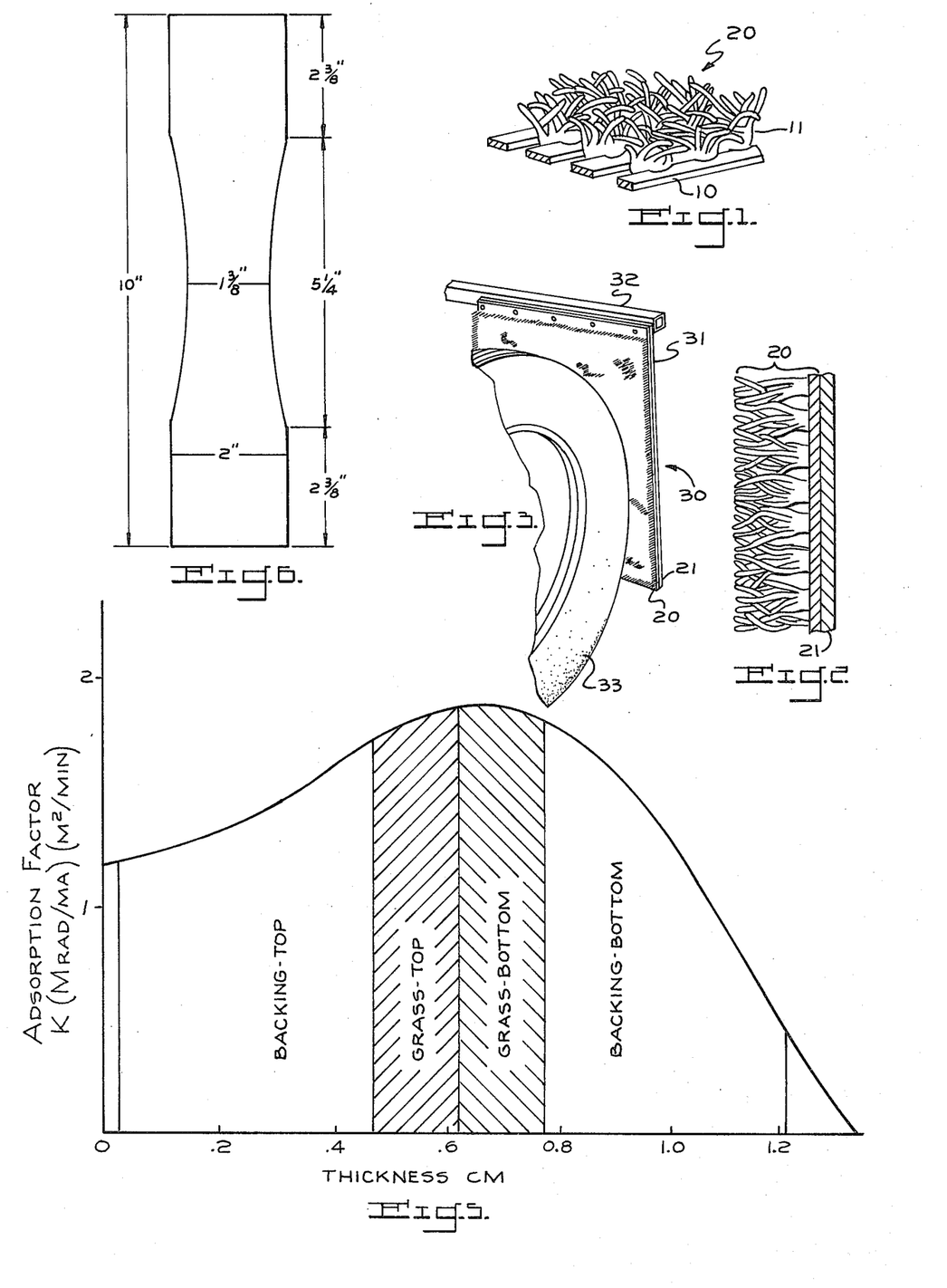
FIG. 1 is a perspective view of a portion of the preferred three-dimensional layer of the laminate according to the present invention.
FIG. 2 is a cross-sectional view of a portion of the preferred three-dimensional laminate according to the present invention.
FIG. 3 shows a spray reducing rain flap according to the present invention mounted in its operative position behind the wheel of a truck.
FIG. 5 shows the nature of radiation distribution in the preferred three-dimensional laminates when utilizing preferred irradiation methods.
FIG. 6 shows a test specimen useful in determining the low temperature ductility properties of irradiated laminates according to the present invention.

The present invention is directed to a process for improving the low temperature ductility properties of strongly bonded laminates and particularly three-dimensional laminates. The laminates which can be treated in accordance with the present invention generally should have at least one layer which has poor low temperature ductility properties and which is radiolytically crosslinkable. The preferred laminates are those fusion bonded three-dimensional laminates described in commonly assigned, copending application Ser. No. 067,205, filed Aug. 16, 1979, in the name of George R. Rawlinson, which is hereby incorporated by reference. These laminates shown in cross-section in FIG. 2, consist in their preferred form of a three-dimensional grass-like layer 20 of low density polyethylene which is fusion bonded to a substrate layer 21 of high density polyethylene. The preferred three-dimensional grass-like layer shown generally at 20 in FIG. 1 is preferably made in accordance with the teaching of U.S. Pat. No. 3,507,010 and U.S. Pat. No. 3,590,109 which are hereby incorporated by reference. The preferred application of such a grass-like three-dimensional laminate is in the form of rain flap devices for reducing the spray and splash of fluid thrown from the wheels of a moving vehicle as described in U.S. Pat. No. 3,899,192, which is also incorporated by reference.

While the following description of the preferred embodiments of the present invention will be described primarily with regard to the fusion bonded, high density/low density polyethylene grass-like rain flap described in the aforementioned incorporated references, it is to be understood that other forms of strongly bonded laminates which include a radiolytically crosslinkable layer of poor low temperature ductility properties can be employed. Typically, polymers with low molecular weights and wide molecular weight distributions (i.e., high melt index polymers) exhibit these poor low temperature properties. This type of polymer is often used in the manufacture of three-dimensional structures, i.e., structures with multiple discrete portions that protrude from the base plane of the layer. Molding of structures of this type (such as the above-described grass-like layer) is facilitated by using a polymer with high melt flow characteristics.

The splash and spray reducing rain flap devices according to the preferred embodiment of the present invention are typically mounted in the same manner as conventional mud flaps. In this arrangement, shown in FIG. 3, the rain flap 30 is rigidly secured along its upper edge 31 to a portion of the truck body 32 rearward of a vehicle wheel 33 and the flap is free to flex around these securement points even though the high density polyethylene substrate layer 21 imparts a substantial amount of stiffness or rigidity to the composite. During vehicle travel the spray reducing rain flap composite is submitted to constant flexure conditions due primarily to wind pressure as a result of the forward movement of the vehicle. In normal operation this wind pressure results in the flexure of the composite rain flap such that the grass-like layer side of the laminate is in tension whereas the exposed substrate side of the laminate is in compression.

The properties of both high density and low density polyethylene are such that the composite rain flap has good ductile properties over most driving temperature conditions. During winter months, however, the temperatures to which these spray reducing rain flaps are exposed may fall well below 0° F. (minus 18° C.). While the high density substrate layer per se has low temperature ductility properties such that a unitary article of this material would remain ductile at temperatures down to at least below minus 30° F. (minus 34° C.), a laminate of this substrate with a three-dimensional low density, high melt index polyethylene layer exhibits significant failures at temperatures below about 0° F. (minus 19° C.). While it is known that low density high melt index polyethylene does not have low temperature ductility properties which are as good as those of high density, low melt index polyethylene, it would be expected that the presence of a ductile backing layer might hold together any portions of the three-dimensional layer which failed due to embrittlement at low temperatures. It was not expected that the entire laminate would fail at low temperatures merely because the three-dimensional layer became brittle. Contrary to these expectations, applicants have surprisingly discovered that the intimately bonded three-dimensional layer of poor low temperature ductility properties causes failure of the entire laminate in low temperature applications.

The unique structure of the preferred three-dimensional laminate of this invention contributes significantly to this surprising occurrence. As described above, this three-dimensional layer contains a base portion consisting of ribs 10 and clusters of blade-like protrusions 11. This configuration, as well as similar three-dimensional configurations presents a plurality of highly localized stress areas resulting from its geometry which serve as initiation points for the cracks which occur as the embrittled grass layer is subjected to flexure stresses at low temperatures. Applicants have discovered that as a result of the intimate association of the two fusion bonded layers, cracks which result in fracture of the three-dimensional layer can cross the indistinct boundary between the layers and result in initiation of defects in the substrate layer. While the substrate layer per se remains ductile at these lower temperatures, the initiated defect may be propagated through the thickness of the substrate layer. As a result, the entire laminate fractures. Tests have shown that in normal operation the failure of this rain flap composite may occur at any point along the length of the rain flap. Since most rain flap applications will subject the device to low temperature conditions for at least part of the year, the problem of failure by this mode is a significant one.

In attempting to solve this problem, the applicants have discovered that an irradiation process employing high energy ionizing radiation is effective to improve the low temperature ductility properties of the low density polyethylene layer without any deleterious effect on the overall composite structure. Without wishing to be bound by any particular theory, applicants believe that the irradiation treatment of the present invention primarily results in a radiolytic crosslinking of the low density polyethylene material. The properties of the backing layer may also be improved somewhat by this treatment.

The particular type of radiation useful according to the present invention is not critical. In general, suitable ionizing radiation includes both particle radiation and electromagnetic radiation. By particle radiation is meant emission of accelerated electrons or nuclear particles such as protons, neutrons, alpha particles, deuterons, beta particles or the like. By ionizing electromagnetic radiation is meant radiation produced when a metal target (e.g., tungsten) is bombarded by electrons possessing appropriate energy. Typical sources of high energy ionizing radiation which can be used in the process of this invention include electron accelerator machines such as the Van de Graaff accelerators and insulating core transformers made by High Voltage Engineering Corporation, resonant transformers made by General Electric, Dynamitrons made by Radiation Dynamics, Inc., or microwave linear accelerators made by Varian Associates and Applied Radiation Corporation. X-rays and gamma rays from radioactive isotopes such as iron 59 or cobalt 60 and beta rays obtained from cobalt 60, carbon 14, phosphorous 32 and strontium 90 can also be used. The preferred source of ionizing radiation is an electron beam generator such as the Dynamitron. The theoretical and practical parameters of operation of this type of device are well known as exemplified in Becker et al., "Accelerator Requirements for Electron Beam Processing", Radiation Physics and Chemistry, Vol. 14, pp. 353–375 (1979).

Selection of the appropriate dosage to achieve the requisite improvement in low temperature ductility properties will depend to a certain extent on the nature of the radiolytically crosslinkable polymer contained in the three-dimensional layer of the laminate being irradiated. The dosage requirements may also be effected in a known manner by the incorporation of materials which promote the more efficient utilization of irradiation energy. Such materials known as pro-rads generally consist of multifunctional materials which promote crosslinking such as trimethylolpropane trimethracrylate. For the low density high melt index polyethylene three-dimensional layer of the preferred embodiment, an average radiation dose of at least about 10 and preferably at least about 25 to about 40 or more megarads has been found to produce a significant improvement in the low temperature ductility properties of the irradiated laminate. It is known that a high energy beam of particles such as those from an electron generator exhibit an absorption profile which varies throughout the thickness of the material being irradiated. Typically, absorption is lower nearer the first exposed surface of the treated layer since the energy of the electrons is not absorbed as rapidly until the velocity of these particles has been slowed. The absorption profile of ionizing radiation in a given material can be readily determined by one of ordinary skill in the art. The term average dose is used in its conventional meaning to refer to the average amount of radiation absorbed throughout the thickness of the material being irradiated.

The manner of supplying the requisite dosage of radiation to the composite material is extremely important in achieving the desired results. As is known, the bombardment of a polymeric material with high energy ionizing radiation results in a temperature rise of the material. In order to prevent deleterious thermal degradation or other changes in properties, it is preferred to subject the laminate of the present invention to a plurality of passes through the irradiating equipment whereby the total dosage is supplied cumulatively through a series of smaller doses. By selecting the per pass dose level to provide a minimum acceptable temperature rise, coupled with the use of an appropriately timed cooling cycle between passes through the irradiation equipment, the process of the present invention can be carried out without any deleterious thermal effects. In practice, it is preferred to limit the maximum temperature of the irradiated laminates to 75° C. Utilizing the preferred electron beam generator, these temperature rise requirements are met when the irradiation dose is an average of 2.5 megarads per pass with a 10 minute cooling period between passes.

The irradiation of the grass-like layer of the three-dimensional laminate of the preferred embodiment is most efficiently accomplished by irradiating the composite with the grass-like surface facing downwardly such that the ionizing electron beam first strikes the outer surface of the high density polyethylene substrate. In this configuration more efficient absorbance occurs in the low density polyethylene grass layer. This has the desirable effect of significantly upgrading the low temperature ductility properties of the grass-like layer in a preferential manner. In a similar manner the irradiation parameters can be controlled so that only the grass-like layer has any significant degree of absorbance.

In one preferred embodiment of the present invention two of the three-dimensional laminates can be irradiated at once by employing a grass-to-grass sandwich of the two laminates. In this embodiment the sandwich is subjected to a certain number of passes which represent about 50% of the total dosage level to be given the composites. This grass-to-grass sandwich is then inverted and the remainder of the dosage applied in a second series of passes. This processing technique results in very high utilization of the ionizing radiation to effect the radiolytic crosslinking in the low density polyethylene layers of each composite. The distribution of radiation absorbance in this sandwich arrangement is shown in FIG. 5. In FIG. 5 the actual amount of low density polyethylene material in the grass layer (i.e., ribs and blades) is shown as an equivalent thickness assuming a density of 0.96 (that of the backing layer); the effects of air between the sandwich can be ignored.

Figure 7:
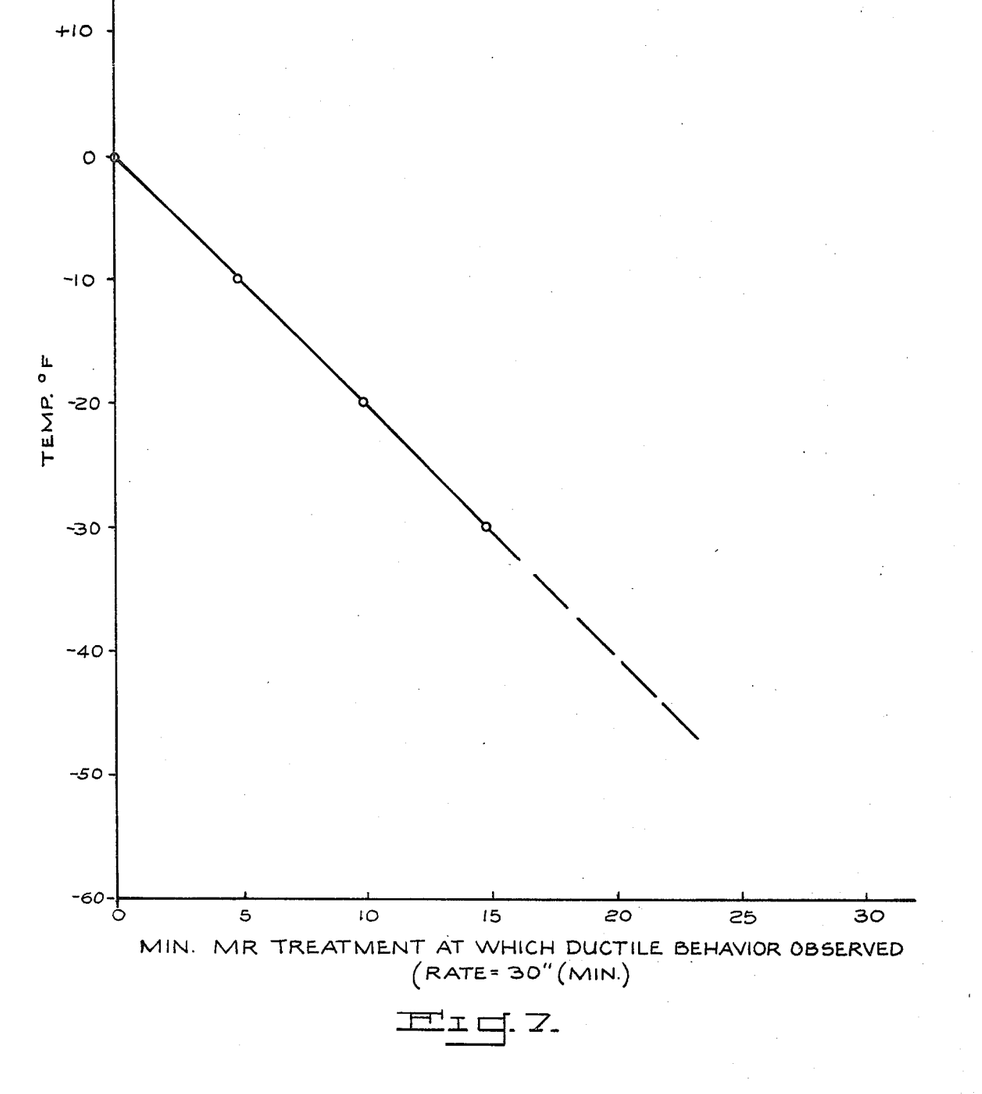
FIGS. 7-14 present graphical illustrations of properties of three-dimensional laminates according to the present invention.

The irradiated laminate of the present invention has significantly improved low temperature ductility properties. As shown by the accompanying examples, this composite retains its overall ductile behavior when subjected to displacement tests at temperatures of down to at least about minus 30° F. (minus 34° C.) and preferably at least about minus 40° F. (minus 40° C.). In general, it has been found that for a given displacement rate (or strain rate) the irradiation treatment necessary to achieve ductile behavior is a remarkably linear function of temperature. At a displacement rate of about 30 inches per minute a lowering of about 10° F. in ductility temperature for each 5 megarads of treatment is observed; see FIG. 7.

As described in the Examples, the products of the present invention can be tested for low temperature ductility properties in two convenient ways. The first of these involves the generation of tensile force-displacement curves obtained for samples of the composite at various temperatures. In order to perform these tests, specimens of the composite material are routed to the shape shown in FIG. 6 with the long direction of the specimen usually cut longitudinally in the direction of the rain flap. While the absence of a long gage sample selection results in limited drawing of ductile materials, it does allow a quantitative indication of the degree of ductility. Tensile tests are run using force-controlled ramp loading at a rate which gave failure in approximately one second. This rate is approximately equivalent to 30 inches per minute displacement rate. Force control gives a load-deflection curve which may be unusual in shape when yielding occurs but which still can be readily interpreted in terms of ductility. Cooling is provided by the injection of liquid nitrogen into the test chamber to give a nitrogen rich atmosphere.

A second test which is useful in demonstrating the ductility of the rain flaps according to the present invention is the bend-to-break test. This test is performed on a full size rain flap which in its most common form comprises a rectangular shaped article approximately 2 feet by 3 feet in its major dimensions. The rain flap is secured to the test apparatus by its normal mounting mechanism which occurs along the two-foot upper edge, and a tensioning harness is attached to the face of the rain flap approximately 8 to 10 inches from the two-foot edge opposite the mounting mechanism. Connected to the tensioning harness is a chain and a spring scale. Tension is applied to the flap by means of a crank and pulley arrangement acting on the chain harness. In the operation of this test, the rain flap sample is mounted to the test apparatus and the opposite end is flexed upwardly by tensioning the harness. As the secured sample flexes upwardly, the angle of bend of the sample is observed and the recorded value for any given test is the maximum angle to which the sample can be flexed before breakage occurs. In order to examine the bend-to-break test values at given sample temperatures, the rain flap samples are placed in a refrigerated container at the appropriate temperature and allowed to equilibrate for a period of at least about 24 hours. The cold samples are then removed and immediately tested in the above-described apparatus. A ductile sample at any given temperature will bend to at least about 90° before breaking. The angle which is measured according to this test is that formed between the original plane of the untensioned rain flap and the plane defined by the attachment point of the sample to the apparatus and the opposing end of the flap just before the sample breaks.

The product of the present invention also possesses improved low temperature impact properties.

The following specific examples are intended to illustrate more fully the nature of the present invention without acting as a limitation upon its scope.

EXAMPLE 1

This Example demonstrates the improvement in low temperature ductility properties achieved by the electron beam irradiation of a rain flap comprising a fusion bonded laminate of a three-dimensional layer of low density polyethylene and a high density polyethylene substrate.

Figure 4:
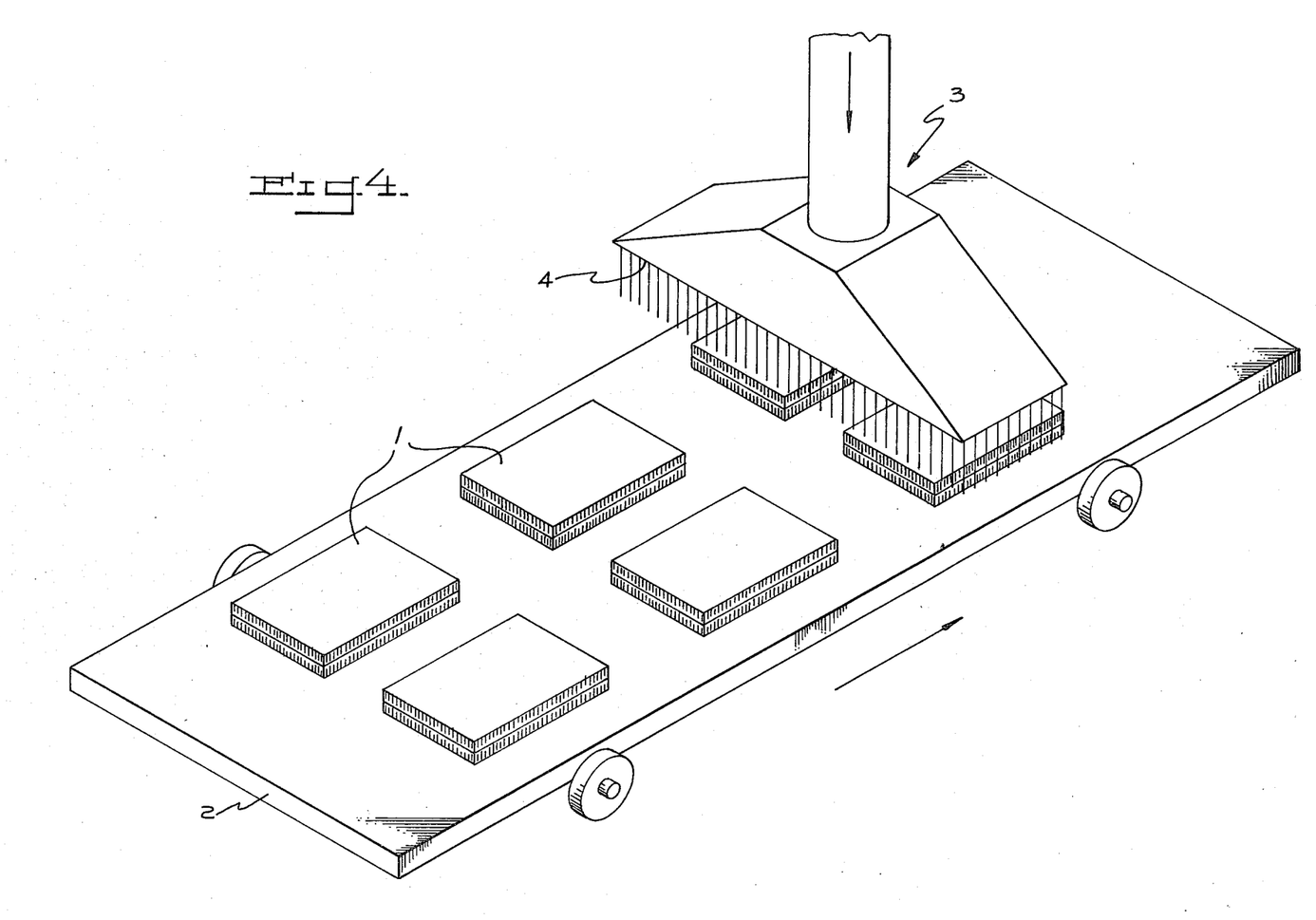
FIG. 4 is a schematic view of the irradiation process of the present invention.

The rain flap according to this Example consisted of a substrate layer of high density polyethylene (about 0.187" thick), fusion bonded to a three-dimensional low density polyethylene (melt index=22) layer having a base portion (intersecting ribs) which is about 0.074" thick and from which the blade-like members protrude about 0.5". The total thickness of the laminate is 0.761±0.12". This laminate was produced according to the fusion bonding process described in the aforementioned U.S. Patent Application Ser. No. 067,205. The above-described rain flap was irradiated in a Dynamitron electron beam generating system rated at 3.0 million electron volts and 30 milliamps which is commercially available from Radiation Dynamics Inc., Melville, N.Y. 11746. Referring to FIG. 4, the samples to be irradiated 1 are placed on moving cart 2 which is designed to travel underneath the generating unit 3 approximately 4" below window 4 from which the radiation beam is emitted. The exposure window of the Dynamitron is approximately 0.5" wide and 50" long. The dosage levels were controled by varying the speed of travel of the cart as it passed under the electron beam window. At a speed of about 46 feet per minute the dosage level absorbed throughout the sample averaged about 2.5 megarads per pass. As described above, the samples were irradiated in pairs which were formed in a grass-to-grass sandwich. This composite sandwich was passed through the beam six times (at about 2.5 megarads per pass) for a total of 15 megarad exposure. The sandwich was then turned over and exposed during six additional passes to 15 megarads. The total exposure was an average of 30 megarads. Approximately 10 minutes of cooling time was provided between passes. The temperature of the laminates did not exceed 75° C. at any point in the process. The physical appearance of the irradiated product was identical to that before irradiation except when white materials are used, they take on a slightly yellow color.

EXAMPLE 2

The above procedures were repeated on a second group of three-dimensional grass laminates of the type described in Example 1. In this Example, however, separate laminates were irradiated over a number of dosages levels ranging from about 1 to 30 Mrads. The laminates were irradiated one at a time with the grass-like layer facing up towards the radiation window. After complete irradiation to the desired dosage level, samples of the irradiated rain flaps of the type shown in FIG. 6 were tested in an Instron Model 1331 Servo Hydraulic test machine to determine the load-displacement relationship for that sample at a given temperature as described above. The results of these tests are shown in FIGS. 8 to 14.

Load-displacement curves indicate whether or not a sample exhibits ductile behavior at the stated temperature. The distance along the abscissa axis from the beginning of the loading (i.e., Load=0) until the fracture point (shown as an X on the drawings) is a measure of the ductility of any given sample. (In the Figures the load application point on the abscissa is moved to the right for each successive curve to facilitate plotting more than one curve on a single graph.) Ductile samples exhibit curves which rise with increasing load to a yield point (the curve maximum point) and continue a significant distance beyond that yield point before fracture. A sample with poor ductility properties exhibits a fracture point either before or just after the yield point on the load-displacement curve.

Figure 8:
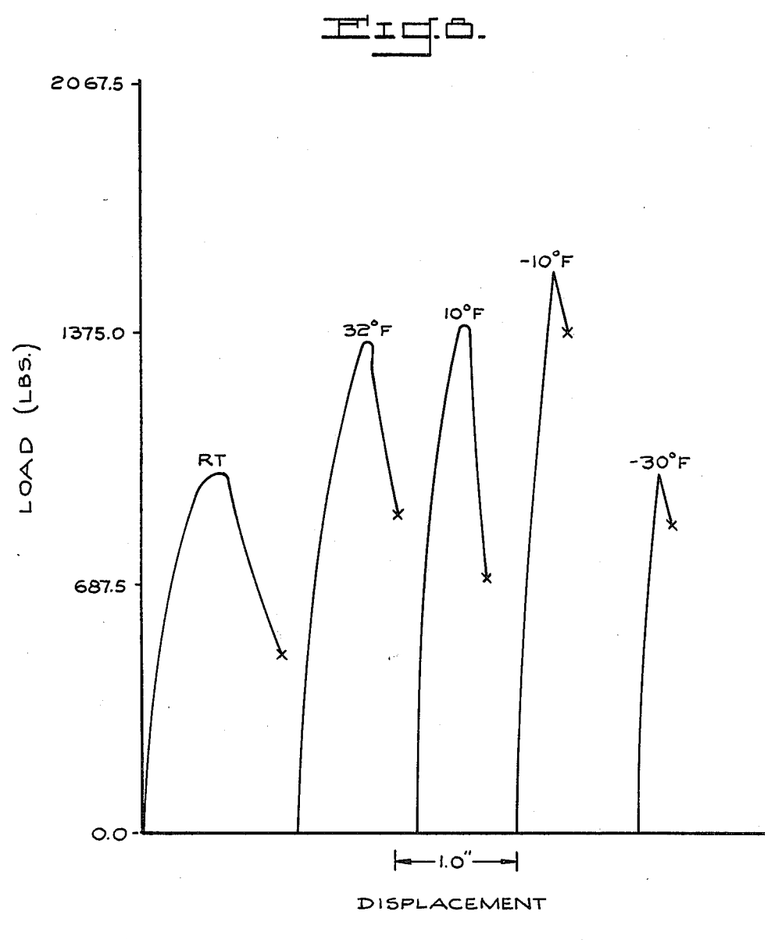

An examination of FIGS. 8 to 14 demonstrates that the irradiated rain flaps of the present invention exhibit improved low temperature ductility properties. FIG. 8 shows the load-displacement curves for non-irradiated samples at the specified temperatures. As can be seen from FIG. 8, the curves for minus 10° F. (minus 23° C.) and minus 30° F. (minus 34° C.) exhibit nonductile behavior, i.e., the sample fractures shortly after the yield point is passed.

Figure 9:
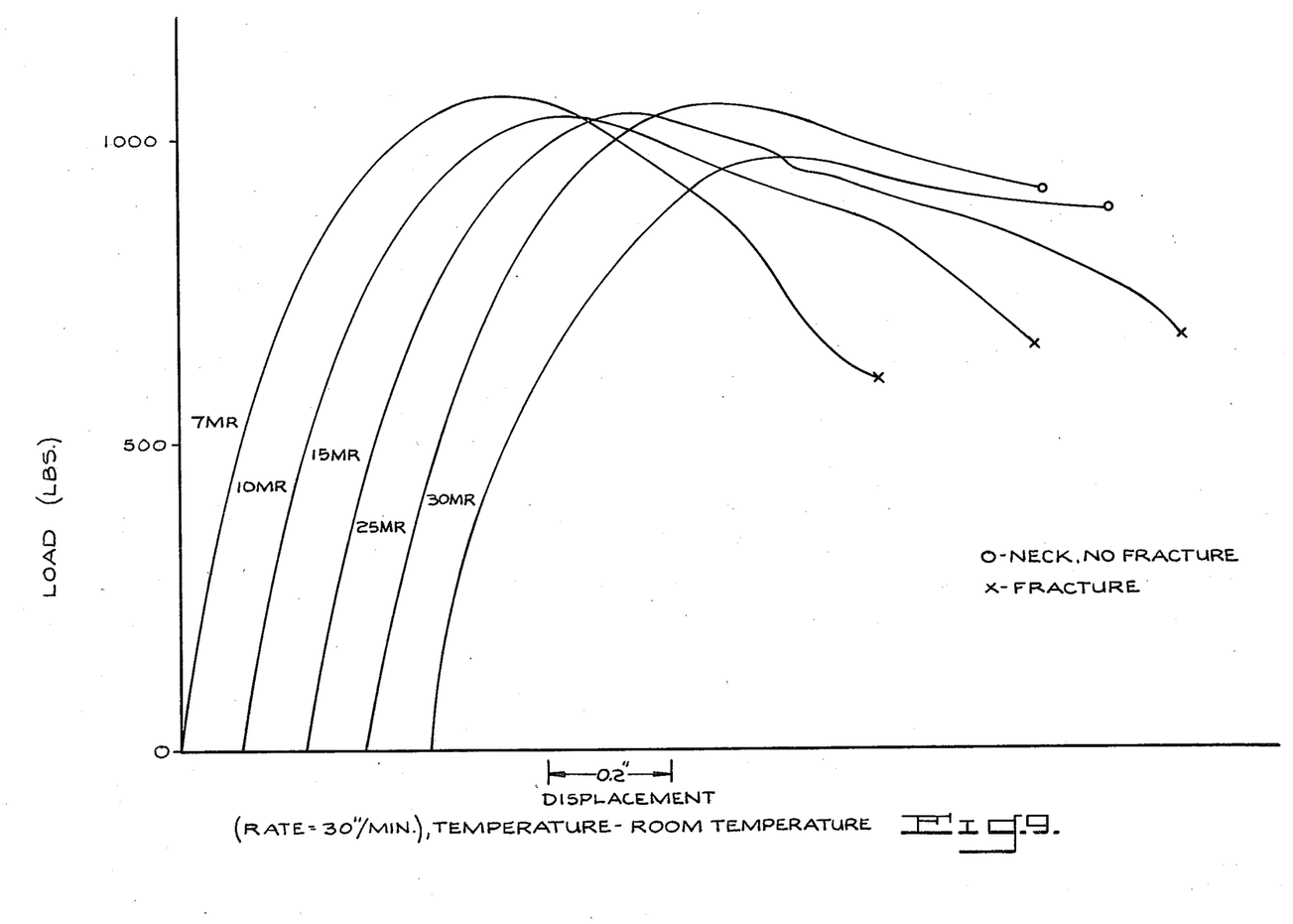

FIG. 9 shows the load-displacement characteristics of samples irradiated at the specified average doses and tested at room temperature. All samples exhibited ductile behavior.

Figure 10:
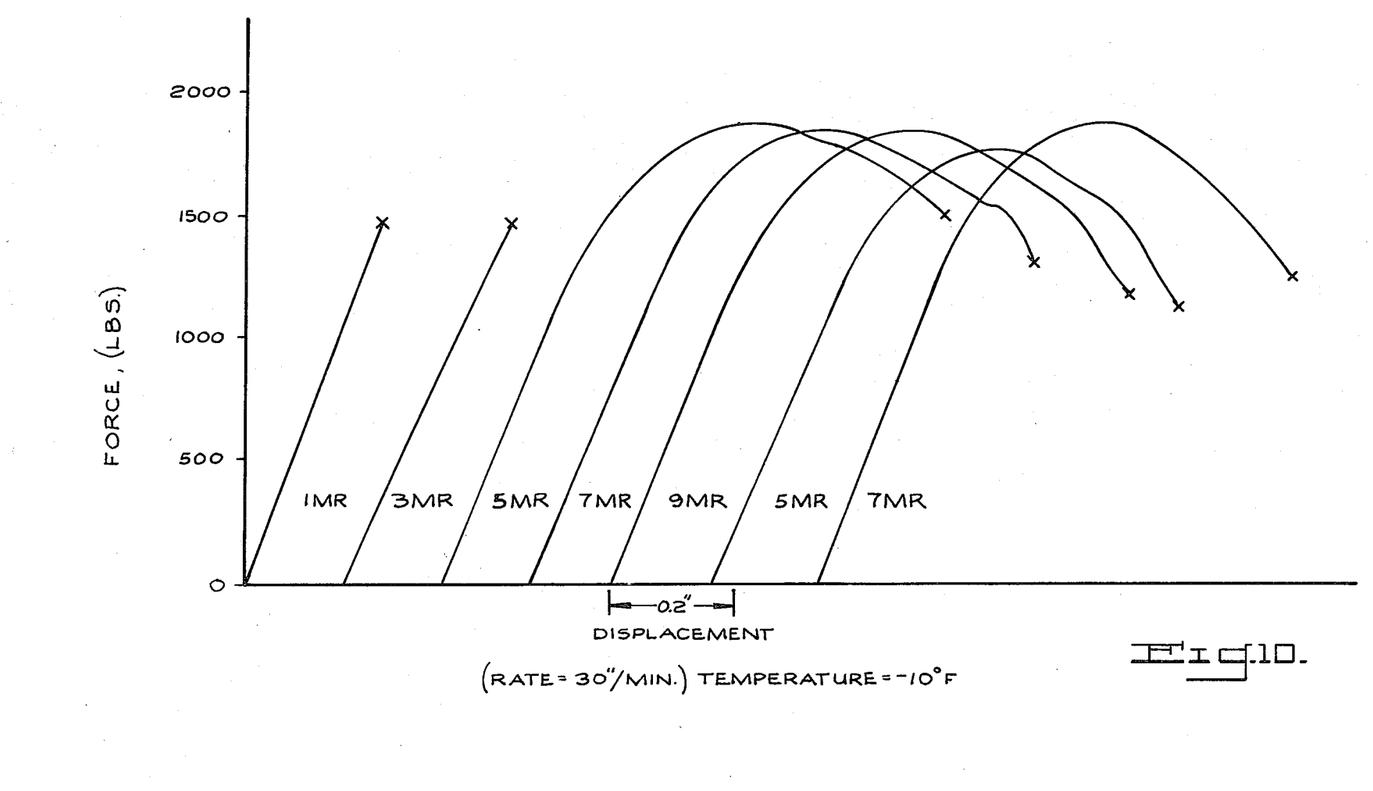
Figure 11:
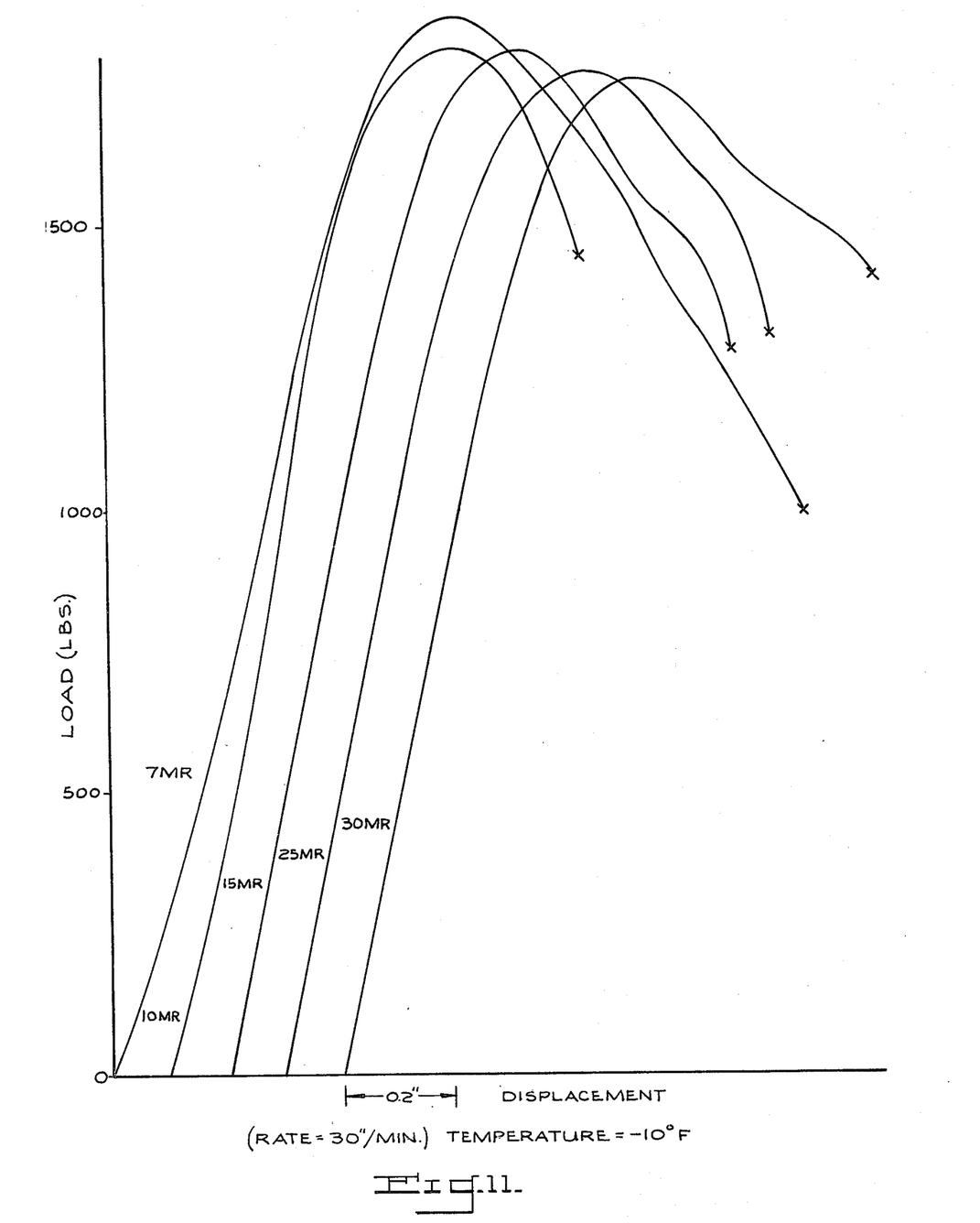

FIGS. 10 and 11 show the load-displacement curves for samples irradiated at the specified average doses and tested at minus 10° F. (minus 23° C.). At 1 and 3 Mrad dosages the sample is clearly not ductile at minus 10° F. (minus 23° C.). FIGS. 10 and 11 demonstrate that samples treated with from 5 to 30 Mrads exhibit ductile behavior at minus 10° F. (minus 23° C.).

Figure 12:
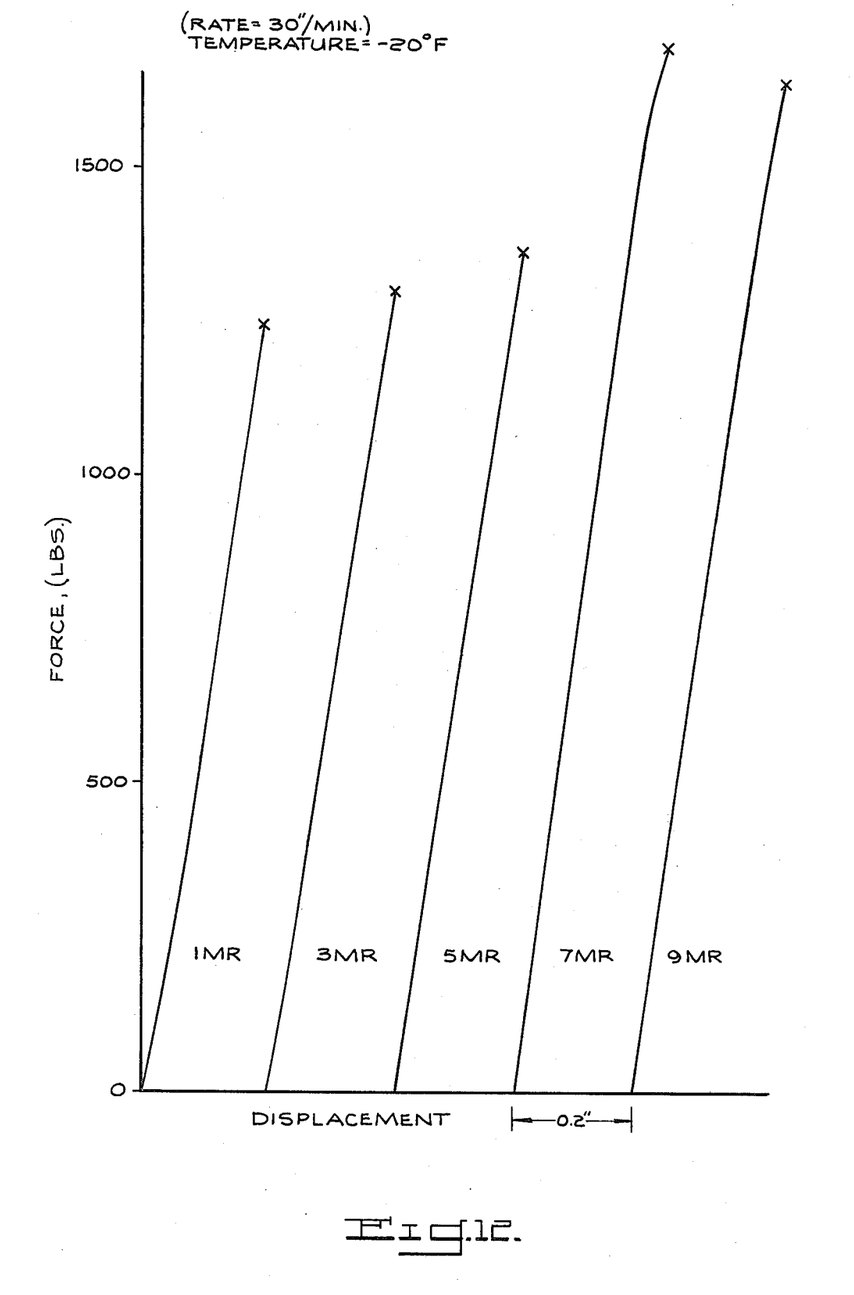
Figure 13:
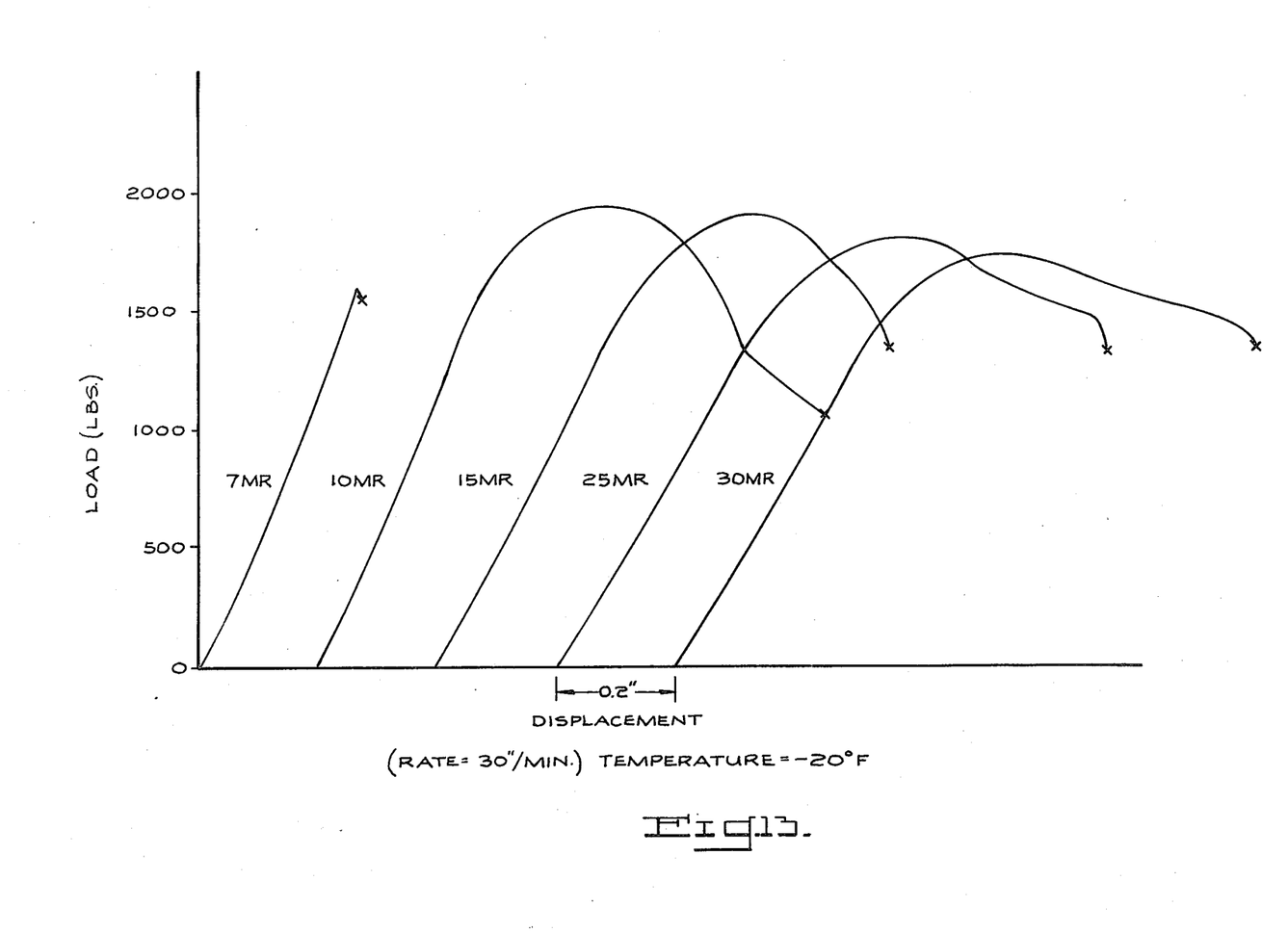

FIGS. 12 and 13 show the load-displacement curves for samples irradiated at the specified average doses and tested at minus 20° F. (minus 29° C.). At radiation levels below 10 Mrads the samples are not ductile. Samples irradiated at from 10 up to 30 Mrads are ductile to minus 20° F. (minus 29° C.). Thus the product of the present invention exhibits ductile behavior at minus 20° F. (minus 29° C.) which is generally equivalent to that of the product at room temperature.

Figure 14:
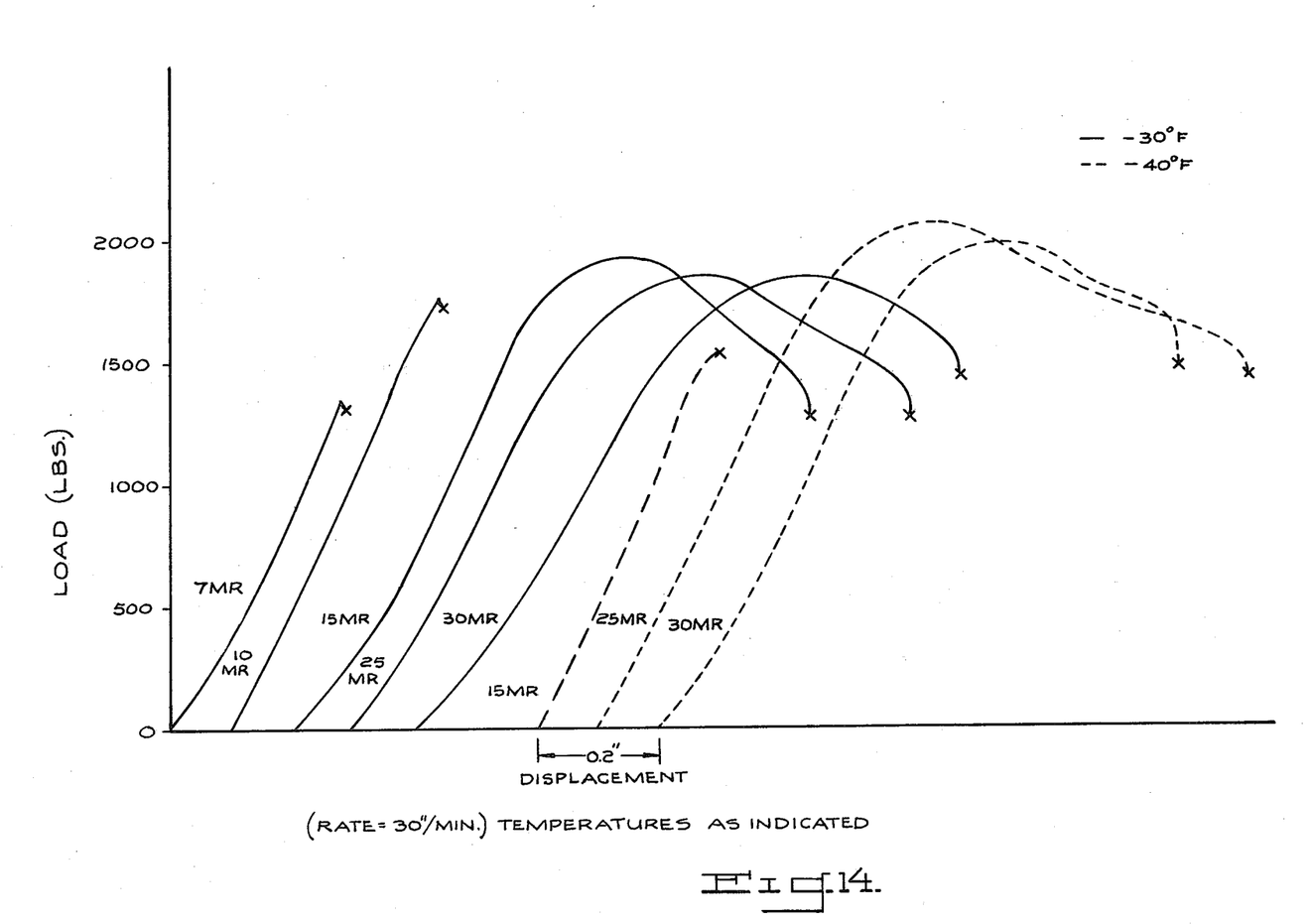

FIG. 14 shows the load-displacement curves for samples irradiated at the specified average dose levels and tested at minus 30° F. (minus 34° C.) and minus 40° F. (minus 40° C.). For the minus 30° F. tests the 7 and 10 Mrad samples were not ductile, but the 15 and above Mrad samples exhibit ductile behavior. For the minus 40° F. tests, samples irradiated at 25 Mrads and above were ductile.

While certain specific embodiments of the invention have been described with particularity herein, it will be recognized that various modifications thereof will occur to those skilled in the art. Therefore, the scope of the invention is to be limited solely by the scope of the appended claims.

I claim:

1. A process for improving the low temperature ductility of a fusion bonded three-dimensional laminate comprising a grass-like three-dimensional layer of low density polyethylene fusion bonded to a high density polyethylene substrate, said process comprising subjecting said laminate to an average dose of at least about 10 megarads of high energy ionizing radiation to provide a laminate which remains ductile at temperatures down to at least about minus 20° F. (minus 29° C.).

2. The process of claim 1 wherein the temperature of said laminate during said radiation is kept below 167° F. (75° C.).

3. The process of claim 1 wherein said laminate is subjected to said radiation by subjecting a sandwich of two such laminates to a source of said radiation with said grass-like layers in a face-to-face relationship.

4. A process for minimizing the tendency of a fusion bonded laminate comprising at least one radiolytically crosslinkable polymeric layer having poor low temperature ductility and at least one polymeric substrate layer having good low temperature ductility to crack through its thickness upon the application of stress at low temperature, said process comprising subjecting said laminate to an average dose of at least about 10 megarads of high energy ionizing radiation to reduce the incidence of crack propagation across the boundary between said layer having poor low temperature ductility and said layer having good low temperature ductility, one said layer being high density polyethylene and the other said layer being low density polyethyelene.

5. The process of claim 4 or 1 wherein said laminate is subjected to an average dose of at least about 30 megarads of high energy ionizing radiation.

6. The process of claim 4 or 1 wherein said laminate is subjected to said radiation during a plurality of passes during each of which a portion of the desired total radiation is supplied to said laminate.

7. The process of claim 4 or 1 wherein said radiation passes through at least one of said substrate layers before striking said radiolytically crosslinkable layer of the same laminate.

8. The process of claim 4 wherein said laminate comprises one radiolytically crosslinkable layer and one substrate layer, and said laminate is subjected to said radiation by subjecting a sandwich of two such laminates to a source of said radiation with said radiolytically crosslinkable layers in a face-to-face relationship.

9. The process of claim 4 wherein said radiolytically crosslinkable polymeric layer comprises high melt index, low density polyethylene.

10. The process of claim 9 wherein said substrate layer comprises high density polyethylene.

11. The process of claim 4 wherein said radiolytically crosslinkable polymeric layer has a three-dimensional structure.

12. The process of claim 11 wherein said radiolytically crosslinkable polymeric layer has a grass-like configuration.

13. A spray-suppression device comprising a three-dimensional layer of radiolytically crosslinked polymer having multiple discrete portions protruding from the base plane of the layer and being fusion bonded to at least one polymeric substrate layer, said laminate having been irradiated with at least about 10 megarads of high energy radiation and remaining ductile at temperatures down to at least about minus 20° F. (minus 29° C.).

14. The irradiated laminate of claim 13 wherein said laminate remains ductile at temperatures down to at least about minus 40° F. (minus 40° C.).

15. A spray suppression device comprising a grass-like three-dimensional layer of low density polyethylene fusion bonded to a high density polyethylene substrate, said spray suppression device having been subjected to high energy ionizing radiation in an amount sufficient to provide a spray suppression device which remains ductile at temperatures down to at least about minus 20° F. (minus 29° C.).

* * * * *